United States Patent
Zhang et al.

(10) Patent No.: US 9,189,632 B2
(45) Date of Patent: Nov. 17, 2015

(54) METHOD FOR PROTECTING SECURITY OF DATA, NETWORK ENTITY AND COMMUNICATION TERMINAL

(71) Applicant: Huawei Technologies Co., Ltd., Shenzhen, Guangdong (CN)

(72) Inventors: Lijia Zhang, Shenzhen (CN); Yixian Xu, Shenzhen (CN); Jing Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 13/943,469

(22) Filed: Jul. 16, 2013

(65) Prior Publication Data

US 2013/0305386 A1 Nov. 14, 2013

Related U.S. Application Data

(63) Continuation of application No. PCT/CN2010/070475, filed on Jan. 17, 2012.

(30) Foreign Application Priority Data

Jan. 17, 2011 (CN) .......................... 2011 1 0009908
Jan. 30, 2011 (CN) .......................... 2011 1 0033569

(51) Int. Cl.
*H04L 29/06* (2006.01)
*G06F 21/60* (2013.01)
(Continued)

(52) U.S. Cl.
CPC .............. *G06F 21/60* (2013.01); *H04L 63/205* (2013.01); *H04W 12/04* (2013.01); *H04W 12/06* (2013.01); *H04W 4/005* (2013.01)

(58) Field of Classification Search
CPC combination set(s) only.
See application file for complete search history.

(56) References Cited

U.S. PATENT DOCUMENTS 8,832,449 B2 * 9/2014 Fischer ......................... 713/181
2009/0117877 A1 5/2009 Yang
(Continued)

FOREIGN PATENT DOCUMENTS

CN 101043323 A 9/2007
CN 101925050 A 12/2010
(Continued)

OTHER PUBLICATIONS

"3rd Generation Partnership Project; Technical Specification Group Services and System Aspects; Security aspects of Machine-Type Communications;(Release 11 )", 3GPP Draft; S3-1 01436-33868V01 O-CI, 3rd Generation Partnership Project (3GPP), MOBilE Competence Centre; vol. SA WG3, Sorrento; 20101115, Dec. 8, 2010.*

(Continued)

*Primary Examiner* — Jeffrey Pwu
*Assistant Examiner* — William Corum, Jr.
(74) *Attorney, Agent, or Firm* — Leydig, Voit & Mayer, Ltd.

(57) ABSTRACT

The present invention relates to communication technologies and discloses a method and an apparatus for protecting security of data, so as to solve the problem of the prior art in which the security of data transmission between a communication terminal which has a characteristic of small data transmission and the network cannot be guaranteed. Information relevant to security context is stored if a communication terminal has a characteristic of small data transmission; current security context is obtained according to the information relevant to security context; and security protection of communication data is performed by employing the current security context. The embodiments of the present invention may be applied to a communication system having a characteristic of small data transmission, such as an MTC and the like.

13 Claims, 5 Drawing Sheets

(51) Int. Cl.
*H04W 12/04* (2009.01)
*H04W 12/06* (2009.01)
*H04W 4/00* (2009.01)

(56) References Cited

U.S. PATENT DOCUMENTS

| | | | |
|---|---|---|---|
| 2010/0054472 A1* | 3/2010 | Barany et al. | 380/270 |
| 2010/0293595 A1* | 11/2010 | Naslund et al. | 726/1 |
| 2012/0282956 A1* | 11/2012 | Kim et al. | 455/466 |
| 2013/0100895 A1* | 4/2013 | Aghili et al. | 370/329 |
| 2013/0308564 A1* | 11/2013 | Jain et al. | 370/329 |

FOREIGN PATENT DOCUMENTS

| | | |
|---|---|---|
| CN | 101931955 A | 12/2010 |
| WO | WO 2010025280 A2 | 3/2010 |

OTHER PUBLICATIONS

3rd Generation Partnership Project; Technical Specification Group Services and System Aspects; TS 33.220 v. 10.0.0 Generic Authentication Architecture (GAA); Generic Bootstrapping Architecture (GBA) (Release 10), Oct. 2010.*

"3GPP TR 33.868—$3^{rd}$ Generation Partnership Project; Technical Specification Group Services and System Aspects; Security aspects of Machine-Type Communications (Release 11)," Version 0.1.0, $3^{rd}$ Generation Partnership Project, Valbonne, France (Nov. 2010).

International Search Report in corresponding PCT Patent Application No. PCT/CN2012/070475 (Apr. 26, 2012).

Written Opinion of the International Searching Authority in corresponding PCT Patent Application No. PCT/CN2012/070475 (Apr. 26, 2012).

* cited by examiner

METHOD FOR PROTECTING SECURITY OF DATA, NETWORK ENTITY AND COMMUNICATION TERMINAL

CROSS-REFERENCE TO RELATED APPLICATIONS

This application is a continuation of International Patent Application No. PCT/CN2012/070475 filed on Jan. 17, 2012, which claims priority to Chinese Patent Application 201110009908.5 filed on Jan. 17, 2011 and Chinese Patent Application 201110033569.4 filed on Jan. 30, 2011, all of which are hereby incorporated by reference in their entireties.

TECHNICAL FIELD

The present invention relates to communication technologies, and more particularly, to a method for protecting security of data, a network side entity and a communication terminal.

BACKGROUND

Machine to machine (Machine to Machine, M2M) communication, called machine type communication (Machine Type Communication, MTC) as well, is a technology which does not need human intervention and in which machine and machine communicate with each other directly. The MTC has features of a huge number of devices, low mobility, and small communication flow of a single device and so on. Only a signalling plane bearer is established between an MTC device and a network side entity. Through the signalling plane bearer, data is carried in control signalling to be transmitted.

In the prior art, after a communication between an MTC device and a network side entity is over, the MTC device and the network side entity might delete security context which is used for protecting security of data transmission, such that when the MTC device and the network side entity transmit data by control signalling at a next time, security protection of the data may not be performed since there is no security context, and the data of the MTC device cannot be transmitted safely.

SUMMARY

An embodiment of the present invention provides a method for protecting security of data, a network side entity and a communication terminal, which can ensure secure transmission of data and improve security of communication.

In one aspect, a method for protecting security of data which is applied to a machine type communication is provided, including: storing, by a network side entity, information relevant to security context if a communication terminal which communicates with the network side entity has a characteristic of small data transmission; obtaining, by the network side entity, current security context according to the information relevant to security context; and performing, by the network side entity, protecting security of communication data by employing the current security context.

Before storing the information relevant to security context, the method further comprises: querying, by the network side entity, a home subscribe server HSS about a machine type communication MTC characteristic information of the communication terminal; determining, by the network side entity, whether the communication terminal has the characteristic of small data transmission according to the MTC characteristic information.

The information relevant to security context comprises: security context, or an algorithm and an authentication vector AV, or an algorithm and a root key Kasme.

The method further comprises: sending, by the network side entity, a detach request message or a detach accept message to the communication terminal, wherein the detach request message or the detach accept message comprises a random number RAND and an authentication token AUTN in the authentication vector AV.

When the information relevant to security context comprises the algorithm and the authentication vector AV, the obtaining, by the network side entity, current security context according to the information relevant to security context, comprises: generating, by the network side entity, the security context according to the algorithm and a Kasme in the AV comprised in the information relevant to security context.

The obtaining, by the network side entity, current security context according to the information relevant to security context, comprises: taking, by the by the network side entity, the security context comprised in the information relevant to security context as the current security context.

The obtaining, by the network side entity, current security context according to the information relevant to security context, comprises: receiving, by the network side entity, a random number generated by the communication terminal; generating, by the network side entity, a new root key according to the random number generated by the communication terminal, a Count value stored by the network side entity and the root key Kasme comprised in the information relevant to security context; generating, by the network side entity, the current security context according to the new root key and the algorithm comprised in the information relevant to security context.

The method further comprises: receiving, by the network side entity, a Count value sent by the communication terminal, wherein the sent Count value is number of times the communication terminal and the network side entity perform fast authentication; and sending a Count value stored by the network side entity to the communication terminal if the received Count value is not consistent with the Count value stored by the network side entity.

The method further comprises: receiving, by the network side entity, a random number generated by the communication terminal, a Count value sent by the communication terminal and a message authentication code MAC value sent by the communication terminal; calculating, by the network side entity, a message authentication code MAC value according to the random number generated by the communication terminal, the Count value sent by the communication terminal, and the algorithm and the root key Kasme comprised in the information relevant to security context; and authenticating, by the network side entity, the communication terminal successfully if the calculated MAC value is consistent with the MAC value sent by the communication terminal.

The method further comprises: receiving, by the network side entity, a random number generated by the communication terminal; generating, by the network side entity, a new root key according to the random number generated by the communication terminal, the Count value stored by the network side entity and the root key Kasme comprised in the information relevant to security context; generating, by the network side entity, a response value RES according to the new root key and the random number generated by the communication terminal; sending, by the network side entity, the generated RES to the communication terminal.

The storing, by the network side entity, information relevant to security context, comprises: storing by the network side entity, the information relevant to security context when last communication is over, wherein the obtaining, by the network side entity, current security context according to the information relevant to security context, comprises: obtaining, by the network side entity, the current security context according to the information relevant to security context at the beginning of the current communication.

In another aspect, a method for protecting security of data which is applied to a machine type communication is further provided, including: storing, by a communication terminal, information relevant to security context if the communication terminal has a characteristic of small data transmission; obtaining, by the communication terminal, current security context according to the information relevant to security context; and performing, by the communication terminal, protecting security of communication data by employing the current security context.

Before storing the information relevant to security context, the method further comprises: obtaining, by the communication terminal, its own MTC characteristic information according to configuration information, and determining whether the communication terminal has the characteristic of small data transmission.

The information relevant to security context comprises: security context, or an algorithm, a random number RAND and an authentication vector AV, or an algorithm and a root key Kasme.

The storing, by a communication terminal, information relevant to security context, comprises: receiving, by the communication terminal, a detach request message or a detach accept message sent by a network side entity; and storing, by the communication terminal, the RAND and the AUTN in the detach request message or the detach accept message.

The obtaining, by the communication terminal, current security context according to the information relevant to security context, comprises: validating, by the communication terminal, the AUTN; generating, by the communication terminal, a Kasme according to the RAND and the AUTN; and generating, by the communication terminal, the current security context according to the generated Kasme and the algorithm in the information relevant to security context.

The obtaining, by the communication terminal, current security context according to the information relevant to security context, comprises: taking, by the communication terminal, the security context comprised in the information relevant to security context as the current security context.

The obtaining, by the communication terminal, current security context according to the information relevant to security context, comprises: obtaining, by the communication terminal, a Count value of the communication terminal and a random number generated by the communication terminal, wherein the Count value of the communication terminal is number of times the communication terminal and the network side entity perform fast authentication; generating a new root key according to the random number generated by the communication terminal, the Count value of the communication terminal and the root key Kasme comprised in the information relevant to security context; and generating the current security context according to the new root key and the algorithm comprised in the information relevant to security context.

After the obtaining, by the communication terminal, a Count value of the communication terminal and a random number generated by the communication terminal, the method further comprises: calculating, by the communication terminal, a message authentication code MAC value according to the random number generated by the communication terminal, the Count value of the communication terminal, and the root key Kasme comprised in the information relevant to security context; and sending the MAC value to the network side entity.

After the obtaining, by the communication terminal, a Count value of the communication terminal and a random number generated by the communication terminal, and before generating the new root key, the method further comprising: receiving a Count value stored by a network side entity sent by a network side; updating the Count value of the communication terminal to the Count value stored by the network side entity if the Count value of the communication terminal is not consistent with the Count value stored by the network side entity.

Before the generating the current security context according to the new root key and the algorithm comprised in the information relevant to security context, the method further comprises: receiving an RES sent by the network side entity; generating an RES according to the new root key and the random number generated by the communication terminal; authenticating, by the communication terminal, the network side entity successfully if the generated RES is consistent with the RES sent by the network side entity.

The storing, by the communication terminal, information relevant to security context, comprises: storing, by the communication terminal, the information relevant to security context when last communication is over, wherein the obtaining, by the communication terminal, current security context according to the information relevant to security context, comprises: obtaining, by the communication terminal, the current security context according to the information relevant to security context at the beginning of the current communication.

In another aspect, a network side entity applied to a machine type communication is further provided, including:

a storing module, configured to store information relevant to security context if a communication terminal which communicates with the network side entity has a characteristic of small data transmission;

a first obtaining module, configured to obtain current security context according to the information relevant to security context; and a security protecting module, configured to perform protecting security of communication data by employing the current security context.

The storing module further comprises: a query module, configured to query a HSS about an MTC characteristic information of the communication terminal; and a determining module, configured to determine that the communication terminal has the characteristic of small data transmission according to the MTC characteristic information queried by the query module.

The network side entity further comprising: a sending module, configured to send a detach request message or a detach accept message to the communication terminal, wherein the detach request message or the detach accept message comprises a random number RAND and an authentication token AUTN in an authentication vector AV.

The first obtaining module comprises: a fourth obtaining sub-module, configured to generate security context according to an algorithm and a Kasme in an AV comprised in the information relevant to security context; or a first obtaining sub-module, configured to take security context comprised in the information relevant to security context as the current security context; or a second obtaining sub-module, configured to receive a random number generated by the communication terminal; a third generating sub-module, configured to generate a new root key according to the random number generated by the communication terminal, a Count value stored by the network side entity and a root key Kasme comprised in the information relevant to security context; and a forth generating sub-module, configured to generate the current security context according to the new root key and an algorithm comprised in the information relevant to security context.

The network side entity further comprises: a second obtaining sub-module, configured to receive a Count value sent by the communication terminal, wherein the sent Count value is number of times the communication terminal and the network side entity perform fast authentication; and a sending sub-module, configured to send a Count value stored by the network side entity to the communication terminal if the received Count value is not consistent with the Count value stored by the network side entity The network side entity further comprises: a second obtaining sub-module, configured to receive a random number generated by the communication terminal, a Count value sent by the communication terminal and a message authentication code MAC value sent by the communication terminal; a calculating sub-module, configured to calculate a message authentication code MAC value according to the random number generated by the communication terminal, the Count value sent by the communication terminal, and an algorithm and a root key Kasme comprised in the information relevant to security context; and an authenticating sub-module, configured to check whether the calculated MAC value is consistent with the MAC value sent by the communication terminal, and determine that the network side entity authenticates the communication terminal successfully if the calculated MAC value is consistent with the MAC value sent by the communication terminal.

The network side entity further comprises: a second obtaining sub-module, configured to receive a random number generated by the communication terminal; a third generating sub-module, configured to generate a new root key according to the random number generated by the communication terminal, the Count value stored by the network side entity and the root key Kasme comprised in the information relevant to security context; an RES generating module, configured to generate a response value RES according to the new root key and the random number generated by the communication terminal; and an RES sending module, configured to send the generated RES to the communication terminal.

In another aspect, a communication terminal applied to a machine type communication is further provided, including:

a storing module, configured to store information relevant to security context if the communication terminal has a characteristic of small data transmission;

a first obtaining module, configured to obtain current security context according to the information relevant to security context; and a security protecting module, configured to protecting security of communication data by employing the current security context.

The storing module further comprises: a determining module, configured to obtain its own MTC characteristic information according to configuration information, and determine whether the communication terminal has the characteristic of small data transmission.

The first obtaining module further comprises: a receiving sub-module, configured to receive a detach request message or a detach accept message sent by a network side entity; a storing sub-module, configured to store an RAND and an AUTN in the detach request message or the detach accept message; a first generating sub-module, configured to validate the AUTN, and generate a Kasme according to the RAND and the AUTN; and a third generating sub-module, configured to generate the current security context according to the generated Kasme and an algorithm in the information relevant to security context; or, a first obtaining sub-module, configured to take security context comprised in the information relevant to security context as the current security context; or, a second obtaining sub-module, configured to obtain a Count value of the communication terminal and a random number generated by the communication terminal, wherein the Count value of the communication terminal is number of times the communication terminal and the network side entity perform fast authentication; a third generating sub-module, configured to generate a new root key according to the random number and the Count value obtained by the second obtaining sub-module, and a root key, Kasme, comprised in the information relevant to security context; and a forth generating sub-module, configured to generate the current security context according to the new root key and an algorithm comprised in the information relevant to security context.

The communication terminal further comprises: a second obtaining sub-module, configured to obtain a Count value of the communication terminal and a random number generated by the communication terminal, wherein the Count value of the communication terminal is number of times the communication terminal and the network side entity perform fast authentication; a third generating sub-module, configured to generate a message authentication code, MAC, value according to the random number and the Count value obtained by the second obtaining sub-module, and a root key, Kasme, comprised in the information relevant to security context; and a sending sub-module, configured to send the generated MAC value to the network side entity.

The second obtaining sub-module is further configured to receive a Count value stored by the network side entity sent by a network side, and update the Count value of the communication terminal to the Count value stored by the network side entity if the Count value of the communication terminal is not consistent with the Count value stored by the network side entity.

The communication terminal further comprises: an RES receiving module, configured to receive an RES sent by the network side entity; an RES generating module, configured to generate an RES according to the new root key generated by the third generating sub-module and the random number obtained by the second obtaining sub-module; and an RES authenticating module, configured to check whether the generated RES is consistent with the RES sent by the network side entity, and determine, if the generated RES is consistent with the RES sent by the network side entity, that the communication terminal authenticates the network side entity successfully.

In accordance with the method for protecting security of data, the network side entity and the communication terminal provided by the embodiments of the present invention, if the communication terminal has a characteristic of small data transmission, information relevant to security context is stored, security context is obtained according to the information relevant to security context, and security protection of communication data is performed by employing the security context, thereby solving the problem of the prior art in which a small data communication terminal deletes security context after a communication is over, causing that the communication data cannot be protected in a next communication. The technical solutions provided by the embodiments of the present invention can ensure secure transmission of data and improve security of communication.

BRIEF DESCRIPTION OF DRAWINGS

In order to describe the technical solutions in the embodiments of the present invention or the prior art more clearly, a brief introduction on the accompanying drawings which are needed in the description of the embodiments or the prior art is given below. Obviously, the accompanying drawings in the description below are merely some embodiments of the present invention, based on which other accompanying drawings can be obtained by those skilled in the art without any inventive efforts.

DESCRIPTION OF EMBODIMENTS

The technical solutions in the embodiments of the present invention are hereinafter described in detail and completely, with reference to the accompanying drawings in the embodiments of the present invention. Apparently, the described embodiments are only a part, but not all, of the embodiments of the present invention. All of the other embodiments that are obtained by those skilled in the art based on the embodiments in the invention without any inventive efforts fall into the scope protected by the present invention.

In order to solve the problem of the prior art in which the security of data transmission between a communication terminal which has a characteristic of small data transmission and a network cannot be guaranteed, the embodiments of the present invention provide a method and an apparatus for protecting security of data.

The method and apparatus for protecting security of data provided by the embodiments of the present invention may be applied to a communication system having a characteristic of small data transmission, such as an MTC and the like. In the present embodiment and the following embodiments, the method and apparatus for protecting security of data are primarily illustrated by taking that they are applied to the MTC as an example.

Figure 1:
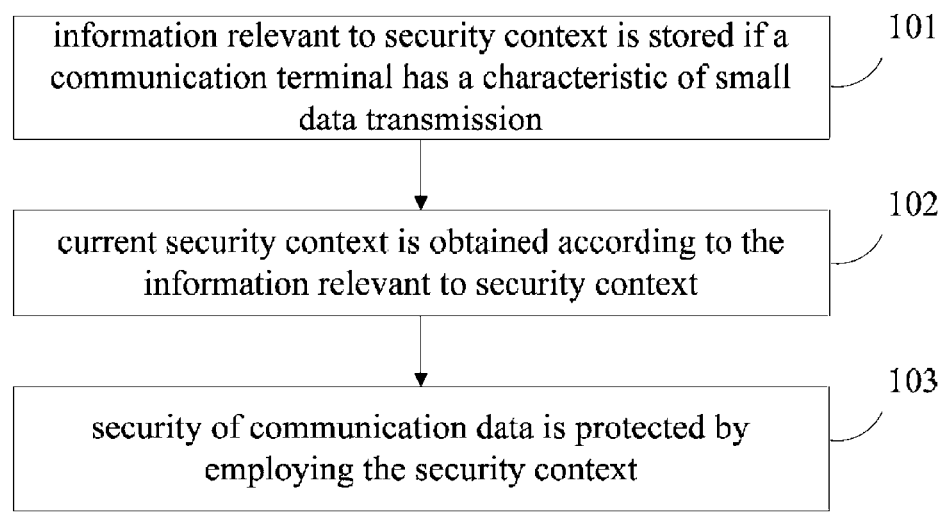
FIG. 1 is a flowchart of a method for protecting security of data provided by an embodiment of the present invention.

As shown in FIG. 1, the method for protecting security of data includes the following steps.

Step 101, information relevant to security context is stored if a communication terminal has a characteristic of small data transmission.

Optionally, when an executive subject of the above-mentioned step is a network side entity, in the method for protecting security of data provided by the embodiment of the present invention, a home subscriber server (Home Subscriber Server, HSS) may be queried for MTC characteristic information of the communication terminal when last communication is over or an authentication and key agreement (Authentication and key agreement, AKA) is performed. Whether the communication terminal has the characteristic of small data transmission is determined according to the MTC characteristic information.

In the present embodiment, the information relevant to security context may include: security context, wherein the security context may be security context which is used in last communication, or may be pre-set security context, or may be newly generated security context; or an algorithm, a random number (RAND) and an authentication token (Authentication Token, AUTN); or an algorithm and a root key (Kasme), and the like, wherein the algorithm may be an algorithm which is used in last communication, or a pre-set algorithm. The Kasme may be a Kasme which is used in last communication, or may be a pre-set Kasme or a newly generated Kasme. Of course, the foregoing is merely exemplary description. In practical applications, the information relevant to security context may also include other information and will not be described redundantly herein.

Optionally, when the executive subject of the above-mentioned step is a communication terminal, and further, if the information relevant to security context includes an RAND and an AUTN, step 101 may include: receiving a detach request (detach request) message or a detach accept (detach accept) message sent by a network side entity; and obtaining the RAND and the AUTN from the detach request message or the detach accept message and storing the RAND and the AUTN.

In practical applications, the RAND and the AUTN may also be transmitted by other messages in last communication and will not be described redundantly herein.

If the information relevant to security context is security context, or, if the information relevant to security context includes an algorithm and a Kasme and so on, storing the information relevant to security context in step 101 may include obtaining the information relevant to the security context locally and storing the information relevant to the security context.

Step 102, current security context is obtained according to the information relevant to security context.

Step 102 may be executed after the last communication is over, e.g., after the communication terminal detaches (detach) from the network side entity last time.

In the present embodiment, if the information relevant to security context is security context, in step 102, the security context may be taken as the security context of the current communication, i.e., the current security context.

If the information relevant to security context includes an algorithm, an RAND and an AUTN, particularly, step 102 may include: performing an authentication according to the algorithm, the RAND and the AUTN, generating a Kasme, and generating the current security context according to the Kasme and the algorithm.

If the information relevant to security context includes an algorithm and a Kasme, particularly, step 102 may further include: obtaining a Count value of the communication terminal and an RAND generated by the communication terminal, wherein the Count value is number of times the communication terminal and the network side entity perform fast authentication; generating a new root key Kasme according to the RAND, the Count value and the Kasme included in the information relevant to security context; and generating the current security context according to the new root key Kasme and the algorithm included in the information relevant to security context.

Step 103, security of communication data is protected by employing the current security context.

Optionally, in order to guarantee the safety and efficiency of the security context and avoid a problem of reducing security protection capacity due to protecting security of the communication data by employing a same security context for a long time. The method for protecting security of data provided by the embodiment of the present invention may further include: obtaining a security ability of the communication terminal; selecting, according to the security ability of the communication terminal, an algorithm to be used in the current communication from an algorithm priority list; and generating new security context by employing the algorithm.

In accordance with the method for protecting security of data provided by the embodiment of the present invention, if the communication terminal has a characteristic of small data transmission, information relevant to security context is stored, security context is obtained according to the information relevant to security context, and protection of security of communication data is performed by employing the security context, thereby solving the problem of the prior art in which a small data communication terminal deletes security context when communication is over, causing that the communication data cannot be protected in next communication. The technical solutions provided by the embodiments of the present invention can ensure secure transmission of data and improve security of communication.

The method for protecting security of data provided by the above embodiments not only may be applied to a user side device, but also may be applied to a network side entity device, so as to achieve protection of security of data.

In the following, the method for protecting security of data provided by the embodiment of the present invention is illustrated by taking that it is applied to a network side entity as an example. The method includes:

the network side entity stores information relevant to security context if a communication terminal which communicates with the network side entity has a characteristic of small data transmission;

the network side entity obtains current security context according to the information relevant to security context; and the network side entity protects security of communication data by employing the current security context.

Specifically, that the network side entity stores the information relevant to security context may further include: storing the information relevant to security context when last communication is over. That the network side entity obtains the current security context according to the information relevant to security context may further include: the network side entity obtains the current security context according to the information relevant to security context at the beginning of the current communication.

Before storing the information relevant to security context, the method may further include:

the network side entity queries a home subscribe server HSS about machine type communication MTC characteristic information of the communication terminal; and the network side entity determines whether the communication terminal has the characteristic of small data transmission according to the MTC characteristic information.

Specifically, the information relevant to security context may include security context, or, include an algorithm and an authentication vector AV, or include an algorithm and a root key Kasme.

Accordingly, that the network side entity obtains the current security context according to the information relevant to security context may include:

the network side entity generates the security context according to the algorithm and a Kasme in the AV included in the information relevant to security context; or the network side entity takes the security context included in the information relevant to security as the current security context; or the network side entity receives a random number generated by the communication terminal;

the network side entity generates a new root key according to the random number generated by the communication terminal, a Count value stored by the network side entity and the root key Kasme included in the information relevant to security context; and the network side entity generates the current security context according to the new root key and the algorithm included in the information relevant to security context.

In order to be synchronized with the communication terminal, the above-mentioned method may further include:

the network side entity sends a detach request message or a detach accept message to the communication terminal, wherein the detach request message or the detach accept message includes a random number RAND and an authentication token AUTN in the authentication vector AV.

In order to be synchronized with the communication terminal, the above-mentioned method may further include:

the network side entity receives a Count value sent by the communication terminal, wherein the sent Count value is number of times the communication terminal and the network side entity perform fast authentication; and a Count value stored by the network side entity is sent to the communication terminal if the received Count value is not consistent with the Count value stored by the network side entity.

The above-mentioned method may further include the following procedure of authentication of the communication terminal:

the network side entity receives a random number generated by the communication terminal, a Count value sent by the communication terminal and a message authentication code MAC value sent by the communication terminal;

the network side entity calculates a message authentication code MAC value according to the random number generated by the communication terminal, the Count value sent by the communication terminal, and the algorithm and the root key Kasme included in the information relevant to security context; and an authentication of the communication terminal performed by the network side entity is successful if the calculated MAC value is consistent with the MAC value sent by the communication terminal.

The above-mentioned method may further include the following steps so as for the communication terminal to authenticate the network side entity:

the network side entity receives a random number generated by the communication terminal;

the network side entity generates a new root key according to the random number generated by the communication terminal, the Count value stored by the network side entity and the root key Kasme included in the information relevant to security context;

the network side entity generates a response number RES according to the new root key and the random number generated by the communication terminal; and the network side entity sends the generated RES to the communication terminal.

In the following, the method for protecting security of data provided by the embodiment of the present invention is illustrated by taking that it is applied to a communication terminal as an example. The method includes:

the communication terminal stores information relevant to security context if the communication terminal has a characteristic of small data transmission;

the communication terminal obtains current security context according to the information relevant to security context; and the communication terminal protects security of communication data by employing the current security context.

Specifically, that the communication terminal stores the information relevant to security context may include: the communication terminal stores the information relevant to security context when last communication is over. Specifically, that the communication terminal obtains the current security context according to the information relevant to security context may include: the communication terminal obtains the current security context according to the information relevant to security context at the beginning of the current communication.

Before storing the information relevant to security context, the method may further include:

the communication terminal obtains its own MTC characteristic information according to configuration information, and determining whether the communication terminal has the characteristic of small data transmission.

The information relevant to security context may include security context, or, an algorithm, a random number RAND and an authentication token AUTN, or an algorithm and a root key Kasme.

Accordingly, that the communication terminal obtains the current security context according to the information relevant to security context includes:

the communication terminal verifies the AUTN;

the communication terminal generates a Kasme according to the RAND and the AUTN; and the communication terminal generates the current security context according to the generated Kasme and the algorithm in the information relevant to security context; or the communication terminal takes the security context included in the information relevant to security as the current security context; or the communication terminal obtains a Count value of the communication terminal and a random number generated by the communication terminal, wherein the Count value of the communication terminal is number of times the communication terminal and the network side entity perform fast authentication;

a new root key is generated according to the random number generated by the communication terminal, the Count value of the communication terminal and the root key Kasme included in the information relevant to security context; and the current security context is generated according to the new root key and the algorithm included in the information relevant to security context.

Specifically, when the information relevant to security context is an algorithm, a random number RAND and an authentication token AUTN, that the communication terminal stores the information relevant to security context may include:

the communication terminal receives a detach request message or a detach accept message sent by the network side entity; and the communication terminal stores the RAND and the AUTN in the detach request message or the detach accept message.

In order to facilitate the verification of the communication terminal performed by the network side entity, after the communication terminal obtains the Count value of the communication terminal and the random number generated by the communication terminal, the method may further include:

a message authentication code MAC value is calculated according to the random number generated by the communication terminal, the Count value of the communication terminal and the root key Kasme included in the information relevant to security context; and the MAC value is sent to the network side entity.

In order to guarantee the synchronization between the communication terminal and the network side entity, after the communication terminal obtains the Count value of the communication terminal and the random number generated by the communication terminal, and before a new root key generated, the method may further include:

a Count value stored by the network side entity is received; and the Count value of the communication terminal is updated to the Count value stored by the network side entity if the Count value of the communication terminal is not consistent with the Count value stored by the network side entity.

Before the current security context is generated according to the new root key and the algorithm included in the information relevant to security context, the method may further include:

an RES sent by the network side entity is received;

an RES is generated according to the new root key and the random number generated by the communication terminal; and the communication terminal determines that an authentication of the network side entity is successful if the generated RES is consistent with the RES sent by the network side entity.

In order for those skilled in the art to understand the technical solutions provided by the embodiments of the present invention more clearly, the method for protecting security of data provided by the embodiment of the present invention is illustrated by taking that the method is applied to an MTC device (i.e., a communication terminal) and a mobility management entity (Mobility Management Entity, MME) (i.e., a network side entity) in a long term evolution (Long Term Evolution, LTE) system as an example.

Figure 2:
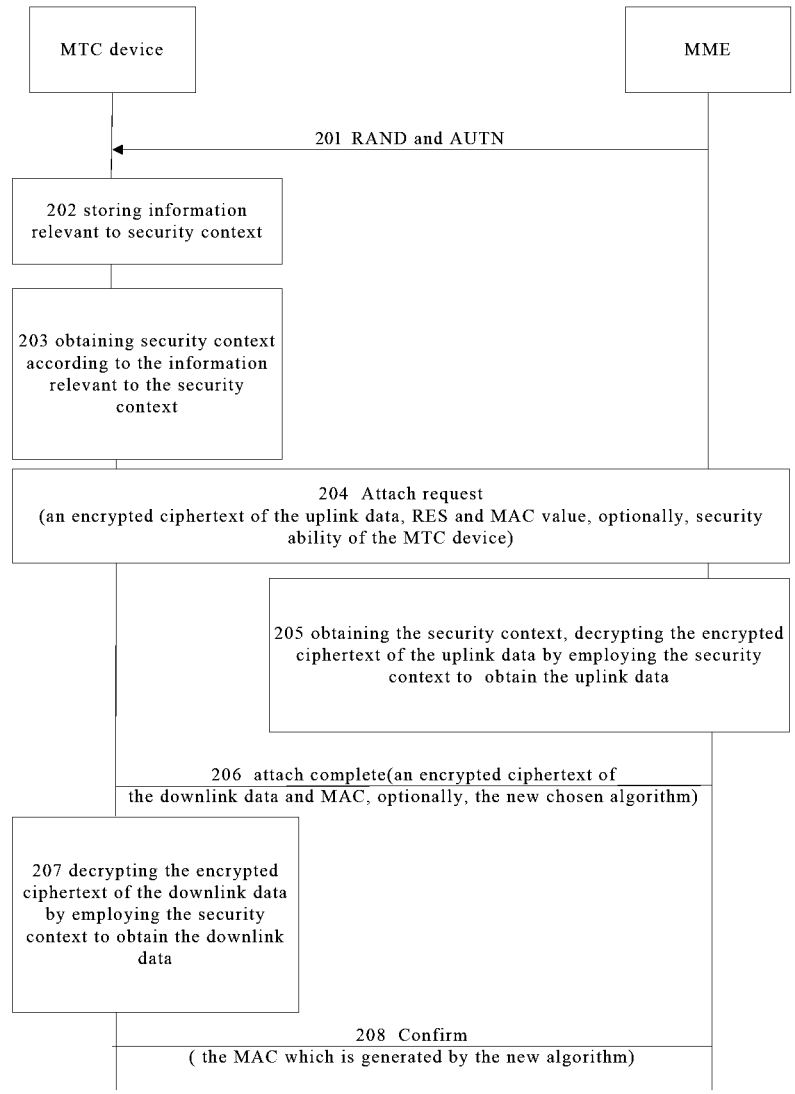
FIG. 2 is a time sequence diagram of a method for protecting security of data provided by another embodiment of the present invention.

As depicted in FIG. 2, the method for protecting security of data provided by another embodiment of the present invention includes the following.

Step 201, an MME queries about transmission characteristic of an MTC device, stores information relevant to security context when last communication is over if the MTC device has a characteristic of small data transmission, wherein the information relevant to security context includes an algorithm and an authentication vector (Authentication Vector, AV), and sends an RAND and an AUTN included in the AV to the MTC device.

In the present embodiment, the information relevant to security context stored by the MME may include an algorithm, an RAND, and an AUTN and so on, wherein the algorithm may be an algorithm which is used in the last communication, or a pre-set algorithm.

In the present embodiment, the MME may query a home subscriber server (Home Subscriber Server, HSS) about MTC characteristic information subscribed by the MTC device at the end of the last communication. The MME may also query the HSS about the MTC characteristic information subscribed by the MTC device during a process of the MTC device and the network side entity performing an AKA. The MME may send the RAND and the AUTN to the MTC device through a detach request message or a detach accept message.

Step 202, the MTC device obtains the RAND and the AUTN from the detach request message or the detach accept message, and stores the information relevant to security context if the MTC device has the characteristic of small data transmission. Specifically, the MTC device obtains its own characteristics according to configuration information when the last communication is over. If the MTC device has the characteristic of small data transmission, the MTC device stores the security context which is used in the last communication. Certainly, the MTC device may also obtain its own characteristic before the last communication is over.

In the present embodiment, the information relevant to security context stored by the MTC device may include an algorithm, an RAND, and an AUTN and so on, wherein the algorithm may be an algorithm which is used in the last communication, or may be a pre-set algorithm.

Step 203, at the beginning of the current communication, the MTC device obtains security context according to the information relevant to security context stored in the step 202.

Particularly, at the beginning of the current communication, the MTC device verifies the AUTN, deduces a Kasme according to the RAND and the AUTN, calculates a non access stratum (Non Access Stratum, NAS) key according to the Kasme and an algorithm, generates the security context, and calculates a response number (Response, RES) according to the RAND, wherein the NAS key includes a NAS encryption key and a NAS integrity key and is a part of the security context. A value of a NAS Count (counter) on the MTC device side is set to an initial value (such as 0) and the NAS Count is started. Particularly, the security context may also be generated according to the deduced Kasme, the algorithm and the value of the counter, non access stratum NAS Count.

Step 204, the MTC device sends an attach request (attach request) message to the MME, wherein the attach request message includes an RES and a message authentication code (Message Authentication Code, MAC). Optionally, when the MTC device needs to perform uplink data transmission, the uplink data is encrypted by employing the security context and an encrypted ciphertext of the uplink data is generated. The encrypted ciphertext of the uplink data may also be carried in the attach request message. Optionally, the attach request message may also include a security ability of the MTC device.

Step 205, the MME searches for an authentication vector (Authentication Vector, AV) after receiving the attach request message, obtains expected response number (Expected Response, XRES) from the AV, verifies whether the XRES is identical to the RES included in the attach request message. If the XRES is identical to the RES included in the attach request message, the MME generates the security context according to an algorithm included in the information relevant to security context and a Kasme in the AV. Particularly, the MME may generates the security context according to the algorithm and the Kasme in the AV, and checks the MAC value included in the attach request message by employing the security context. If the check passes, the MME decrypts the encrypted ciphertext of the uplink data included in the attach request message by employing the security context to obtain the uplink data.

Optionally, if the attach request message further includes the security ability of the MTC device, the MME may choose a new algorithm according to the security ability of the MTC device and active a new NAS key according to the new chosen algorithm.

It should be noted that if the MME is not an MME to which the MTC device originally accesses, the MME needs to ask the MME to which the MTC device originally accesses for the AV and the algorithm of the MTC device, and then checks the MAC value and the RES value; or, the MME sends the entire attach request message to the MME to which the MTC device originally accesses, such that the MAC value and the RES value are checked, and sends the AV of the MTC device to the MME if the check of the MAC and the RES is successful. The MME calculates a new NAS key according to the new chosen algorithm and the Kasme.

Step 206, when it is necessary to transmit downlink data, the MME encrypts the downlink data by employing the security context obtained in step 205, and generates an encrypted ciphertext of the downlink data, and the MME sends an attach complete (attach complete) message to the MTC device. The attach complete message includes the encrypted ciphertext of the downlink data and the MAC.

Optionally, if the MME chooses a new algorithm in step 205, the attach complete message further includes the new chosen algorithm.

Step 207, the MTC device checks the MAC value included in the attach complete message according to the security context obtained in step 203. If the check passes, the encrypted ciphertext of the downlink data included in the attach complete message is decrypted by employing the security context to obtain the downlink data.

Optionally, if the attach complete message includes an updated algorithm, the MTC device generates a new NAS key according to the updated algorithm and the Kasme, generates new security context, checks the MAC value included in the attach complete message by employing the new security context, and decrypts the encrypted ciphertext of the downlink data included in the attach complete message by employing the new security context to obtain the downlink data if the check passes.

Optionally, in order to guarantee that both the MTC device and the MME active the new security context, the method may further include:

Step 208, the MTC device sends a Confirm message to the MME, wherein the Confirm message includes an MAC which is generated by updated security context.

It should be noted that, in the present embodiment, the Confirm message may be a new NAS message, or may be other existing NAS messages, which will not be described redundantly herein.

Optionally, in the present embodiment, when there is uplink data to be transmitted, the Confirm message may also include an encrypted ciphertext of the uplink data which is encrypted by employing the updated security context.

In accordance with the method for protecting security of data provided by the embodiment of the present invention, if the communication terminal has a characteristic of small data transmission, information relevant to security context is stored, security context is obtained according to the information relevant to security context, and security protection of communication data is performed by employing the security context, thereby solving the problem of the prior art in which a small data communication terminal deletes security context when communication is over, causing that the communication data cannot be protected in next communication. The technical solutions provided by the embodiments of the present invention can ensure secure transmission of data and improve security of a communication.

Figure 3:
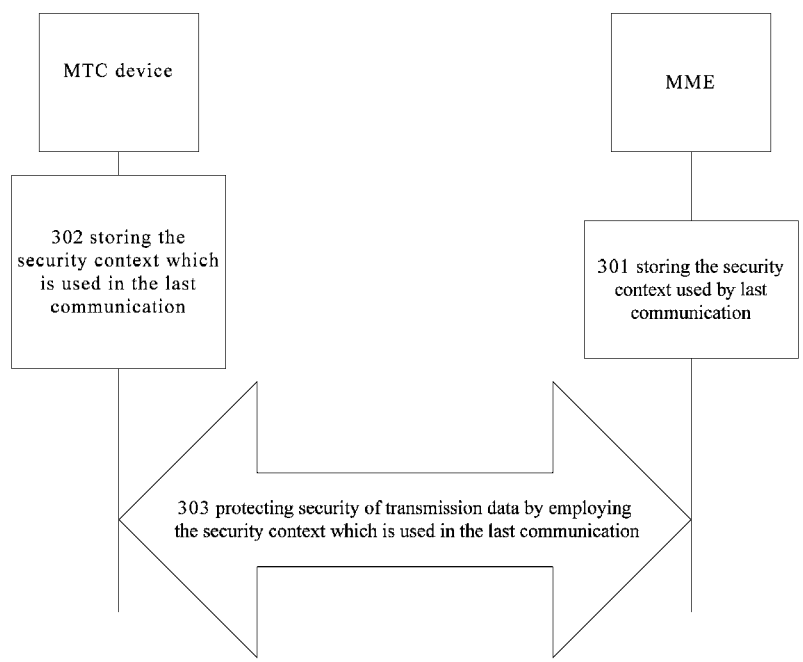
FIG. 3 is a time sequence diagram of a method for protecting security of data provided by still another embodiment of the present invention.

As shown in FIG. 3, the method for protecting security of data provided by another embodiment of the present invention includes the following steps.

Step 301, an MME queries about MTC characteristic information of an MTC device, and stores security context used by last communication when the last communication is over if the MTC device has a characteristic of small data transmission.

In the present embodiment, the MME may query, at the end of last communication, an HSS about the MTC characteristic information subscribed by the MTC device. The MME may also query the HSS about the MTC characteristic information subscribed by the MTC device during a process of the MTC device and the network side entity performing an AKA, and store the MTC characteristic information.

Step 302, the MTC device obtains its own characteristics according to configuration information at the end of the last communication. If the MTC device has the characteristic of small data transmission, the MTC device stores the security context which is used in the last communication. Certainly, the MTC device may also obtain its own characteristics before the last communication is over.

Step 303, when it is necessary to perform data transmission between the MTC device and the MME, the MTC device encrypts uplink data by employing the security context stored in step 302. The MME encrypts downlink data by employing the security context stored in step 301.

In accordance with the method for protecting security of data provided by the embodiment of the present invention, if the communication terminal has a characteristic of small data transmission, information relevant to security context is stored, security context is obtained according to the information relevant to security context, and security protection of communication data is performed by employing the security context, thereby solving the problem of the prior art in which a small data communication terminal deletes security context when communication is over, causing that the communication data cannot be protected in next communication. The technical solutions provided by the embodiments of the present invention can ensure secure transmission of data and improve security of communication.

Figure 4:
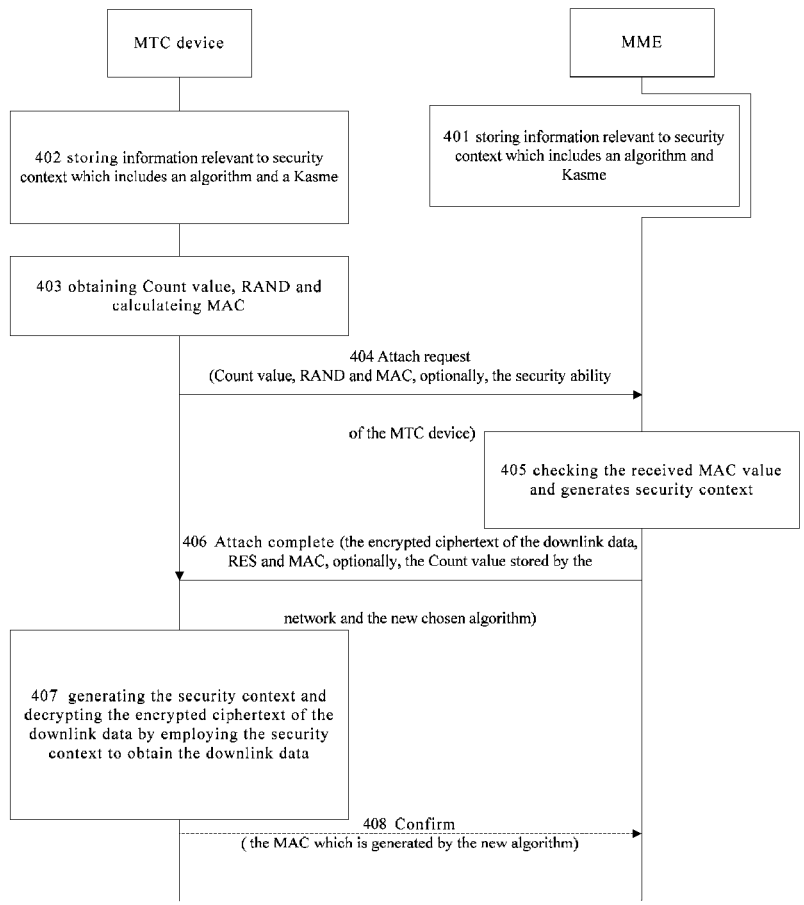
FIG. 4 is a time sequence diagram of a method for protecting security of data provided by still another embodiment of the present invention.

As shown in FIG. 4, a method for protecting security of data is further provided by another embodiment of the present invention, and the method includes the following.

Step 401, an MME queries about MTC characteristic information of an MTC device, and stores information relevant to security context when last communication is over if the MTC device has a characteristic of small data transmission, wherein the information relevant to security context includes an algorithm and a Kasme.

In the present embodiment, the MME may query, at the end of last communication, an HSS about the MTC characteristic information subscribed by the MTC device. The MME may also query, before the last communication is over, the HSS about the MTC characteristic information subscribed by the MTC device, e.g., during a process of the MTC device and the network side entity performing an AKA, and store the MTC characteristic information.

Step 402, the MTC device obtains its own characteristics according to configuration information at the end of last communication. If the MTC device has the characteristic of small data transmission, the MTC device stores the information relevant to security context, wherein the information relevant to security context includes an algorithm and a Kasme. Certainly, the MTC device may also obtain its own characteristics before the last communication is over.

Step 403, the MTC device obtains its own Count value and a random number RAND generated by the MTC device, wherein the Count value of the MTC device is number of times the MTC device and the network side entity perform fast authentication, and calculates a message authentication code MAC value according to the random number generated by the communication terminal, the Count value of the MTC device and the algorithm and the root key Kasme included in the information relevant to security context. Step 403 may be executed at the beginning of the current communication.

The Count value of the MTC device is number of times the MTC device performs fast authentication. Optionally, the MTC device performs an AKA and generates new security context when the Count value of the MTC device achieves a pre-set threshold.

Step 404, the MTC device sends the Count value of the MTC device, the RAND generated by the MTC device and the MAC value calculated in step 403 to the MME. Optionally, the security ability of the MTC device may be sent as well. Optionally, the parameter mentioned above may be carried by an attach request message.

Step 405, security context is generated in accordance with the Count value stored by the network side entity (such as MME), the received RAND value, and the algorithm and the Kasme stored in step 401.

Optionally, before the MME generates the security context, the MME may check the received MAC value of the MTC device according to the algorithm and the Kasme included in the information relevant to security context stored in step 401. If the check passes (i.e., authentication is successful), the security context is generated. Particularly, checking the received MAC value of the MTC device includes calculating, by the MME, a message authentication code MAC value according to the random number generated by the MTC device, the Count value sent by the MTC device, the algorithm and the Kasme included in the information relevant to security context. If the calculated MAC value is consistent with the MAC value sent by the communication terminal, authentication of the communication terminal performed by the network side entity is successful.

Particularly, the MME generates new Kasme and RES needed by the current communication according to the received Count value, the RAND value and the Kasme stored in step 401. Particularly, the new Kasme=KDF (a Kasme, an RAND, and a Count value stored by the network side entity), and the new RES=KDF (the new Kasme and RAND). The security context is generated according to the new Kasme and the algorithm stored in step 401.

The Count value stored by the network side entity is number of times the MTC device performs fast authentication. If the Count value received by the MME is not consistent with the Count value stored by the network side entity, the Count value stored by the network side entity is sent to the MTC device so as to guarantee the synchronization between the Count value of the MTC device and that of the network side entity. Optionally, the Count value stored by the network side entity may be carried by an attach complete message. Optionally, the MME may also choose a new algorithm according to a received security ability of the MTC device and generate a new NAS key according to the new chosen algorithm.

Step 406, the MME sends an attach complete message which includes an RES to the MTC device, and protects integrity of the message, i.e., an MAC value may be added in the message for verification. Optionally, when there is downlink data to be transmitted, the MME encrypts the downlink data by employing the security context generated in the step 405, and generates an encrypted ciphertext of the downlink data. The attach complete may further carry the encrypted ciphertext of the downlink data. Optionally, the attach complete message may further include the Count value and/or the new chosen algorithm stored by the network side entity.

It should be noted that if the MME is not an MME to which the MTC device originally accesses, the MME needs to ask the MME to which the MTC originally accesses for the Kasme of the MTC device and the Count value by which the MTC device performs fast authentication (stored by the network side entity), and then checks the MAC value; or, the MME sends the entire attach request message to the MME to which the MTC device originally accesses, such that the MAC value is checked. If the check on the MAC is successful, the MME to which the MTC device originally accesses sends the Kasme and the Count value by which the MTC device performs fast authentication to the MME, and the MME calculates a new Kasme and RES.

Step 407, the MTC device generates a new Kasme and RES needed by the current communication according to the Count value of the MTC device, the RAND value and the Kasme stored in step 402. Particularly, the new Kasme=KDF (a Kasme, an RAND, and a Count value of the MTC device), and the new RES=KDF (the new Kasme and RAND). The security context is generated according to the new Kasme and the algorithm stored in the step 402.

Before generating the security context, the MTC device may further authenticate the network side entity, i.e., check the RES sent by the network side. Particularly, the MTC device may determine whether the RES generated by the MTC device is consistent with the RES sent by the network side. If the RES generated by the MTC device is consistent with the RES sent by the network side, the authentication of the network side entity performed by the MTC device is successful. After the authentication is successful, the MTC device generates the security context according to the new Kasme and the algorithm stored in step 402.

Optionally, if the attach complete message includes the Count value stored by the network side entity, the MTC device generates a new Kasme and RES needed by the current communication according to the Count value stored by the network side entity, the RAND value and the Kasme stored in the step 402, and generates the security context according to the new Kasme and the algorithm stored in step 402, wherein the new Kasme=KDF (a Kasme, an RAND, and a Count value stored by the network side entity), and the new RES=KDF (the new Kasme and RAND).

In accordance with the generated security context, the MAC value included in the attach complete message is checked. If the MAC value passes the check, the encrypted ciphertext of the downlink data included in the attach complete message is decrypted by employing the security context to obtain the downlink data.

Optionally, if the attach complete message includes a new chosen algorithm, the MTC device generates a new NAS key according to the new chosen algorithm, checks the MAC value included in the attach complete message by employing the new NAS key, and decrypts, when the check passes, the encrypted ciphertext of the downlink data included in the attach complete message by employing the new NAS key to obtain the downlink data.

Optionally, in order to guarantee that both the MTC device and the MME activate the new NAS key, the method may further include:

Step 408, the MTC device sends a Confirm message to the MME, wherein the Confirm message includes the MAC generated by employing updated security context.

It should be noted that, in the present embodiment, the Confirm message may be a new NAS message, or may be other existing NAS messages, which will not be described redundantly herein.

Optionally, in the present embodiment, when there is uplink data to be transmitted, the Confirm message may also include encrypted ciphertext of the uplink data encrypted by employing the updated security context.

In accordance with the method for protecting security of data provided by the embodiment of the present invention, if the communication terminal has a characteristic of small data transmission, information relevant to security context is stored, security context is obtained according to the information relevant to security context, and security protection of communication data is performed by employing the security context, thereby solving the problem of the prior art in which a small data communication terminal deletes security context when communication is over, causing that the communication data cannot be protected in next communication. The technical solutions provided by the embodiments of the present invention can ensure secure transmission of data and improve security of a communication.

Specifically, in the above-mentioned embodiment, the network side entity or the communication terminal stores the information relevant to security context when communication is over, more specifically, when the network side entity and the communication terminal perform detaching operation last time. It may be stored before performing detaching, or stored at a same time with detaching, or stored after detaching. Specifically, for instance, the MTC device or network side entity stores the information relevant to security context before initiating a detach request; or the MTC device or network side entity stores the information relevant to security context after receiving the detach accept; or MTC device or the network side entity stores the information relevant to security context before initiating the detach request or after receiving the detach accept. In the above-mentioned embodiment, the network side entity or the communication terminal obtains current security context according to the information relevant to security context, specifically, at the beginning of the current communication, e.g., when the network side entity or the communication terminal is in a detach state, or before or after initiating an attach request, or after an authentication is successful, or the like.

Figure 5:
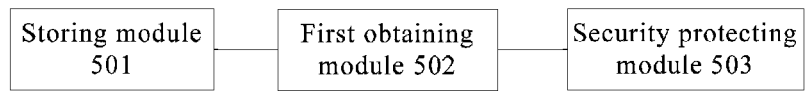
FIG. 5 is a first schematic diagram of a structure of an apparatus for protecting security of data provided by an embodiment of the present invention.

As shown in FIG. 5, an embodiment of the present invention further provides an apparatus for protecting security of data which is configured to execute the steps of the above-mentioned embodiments of the method. The apparatus includes:

a storing module 501, configured to store information relevant to security context if a communication terminal has a characteristic of small data transmission;

a first obtaining module 502, configured to obtain security context according to the information relevant to security context stored by the storing module 501; and a security protecting module 503, configured to protect security of communication data by employing the security context obtained by the first obtaining module 502.

Figure 6:
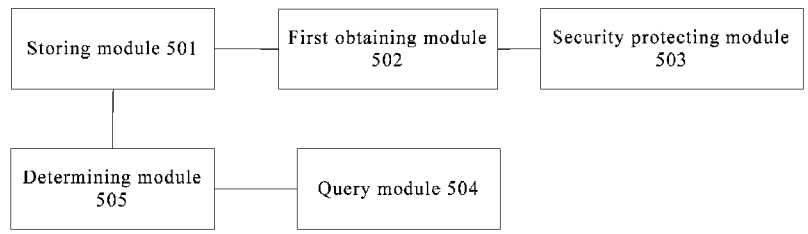
FIG. 6 is a second schematic diagram of the structure of the apparatus for protecting security of data provided by the embodiment of the present invention.

Additionally, as shown in FIG. 6, when the apparatus is applied to a network side entity, the apparatus for protecting security of data provided by the embodiment of the present invention may further include:

a query module 504, configured to query a HSS about an MTC characteristic information of the communication terminal; and a determining module 505, configured to determine that the communication terminal has the characteristic of small data transmission according to the MTC characteristic information queried by the query module 504.

Figure 7:
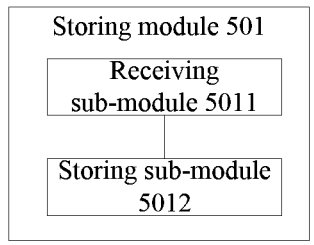
FIG. 7 is a schematic diagram of a structure of the storing module of the apparatus for protecting security of data provided by the embodiment of the present invention as shown in FIG. 5.

Additionally, as shown in FIG. 7, when the apparatus is applied to a communication terminal, the storing module 501 may include:

a receiving sub-module 5011, configured to receive a detach request message or a detach accept message sent by the network side entity if the information relevant to security context includes an RAND and an AUTN; and a storing sub-module 5012, configured to obtain and store the RAND and the AUTN from the detach request message or the detach accept message received by the receiving sub-module 5011.

Figure 8:
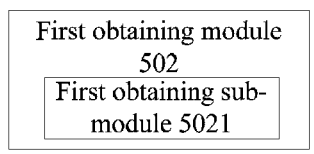
FIG. 8 is a first schematic diagram of a structure of an first obtaining module of the apparatus for protecting security of data provided by the embodiment of the present invention as shown in FIG. 5.

Additionally, as shown in FIG. 8, the first obtaining module 502 may include:

a first obtaining sub-module 5021, configured to take the stored security context as current security context if the information relevant to security context is security context which is used by last communication.

Figure 9:
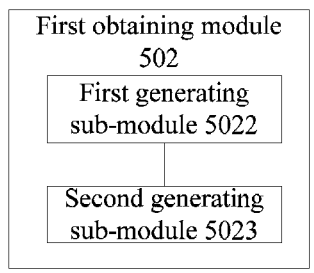
FIG. 9 is a second schematic diagram of the structure of the first obtaining module of the apparatus for protecting security of data provided by the embodiment of the present invention as shown in FIG. 5.

Additionally, as shown in FIG. 9, the first obtaining module 502 may include:

a first generating sub-module 5022, configured to perform authentication according to an algorithm, an RAND and an AUTN included in the information relevant to security context, and generate a Kasme; and a second generating sub-module 5023, configured to generate the security context according to the Kasme generated by the first generation sub-module 5022, the algorithm and a counter NAS Count value, wherein the Count value is an initial value.

Additionally, the first obtaining module 502 may further include:

a second obtaining module, configure to obtain an RAND and a Count value generated by the communication terminal, wherein the Count value is number of times the communication terminal and the network side entity perform fast authentication;

a third generating sub-module, configured to generate a new root key Kasme according to the RAND obtained by the second obtaining sub-module, the Count value and the root key Kasme included in the information relevant to security context; and a fourth generating sub-module, configured to generate the security context according to the new root key Kasme generated by the third generation sub-module and the algorithm included in the information relevant to security context.

Additionally, the first obtaining module 502 may further include:

a calculating sub-module, configured to calculate an MAC value according to the RAND obtained by the second obtaining sub-module, the Count value and the root key Kasme included in the information relevant to security context; and an authenticating sub-module, configured to check whether the MAC value calculated by the calculating sub-module is consistent with the MAC value sent by the communication terminal. If the MAC value calculated by the calculating sub-module is consistent with the MAC value sent by the communication terminal, an authentication of the communication terminal performed by a network is achieved.

Additionally, the first obtaining module 502 may further include:

a checking sub-module, configured to check whether the Count value of the communication terminal obtained by the second obtaining sub-module is consistent with the Count value stored by the network side entity; and a third generating sub-module, configured to generate a new root key Kasme according to the RAND obtained by the second obtaining sub-module, the Count value stored by the network side entity and the root key Kasme included in the information relevant to security context if the check result of the checking sub-module is not consistent.

Additionally, the first obtaining module 502 may further include:

a sending sub-module, configured to send the Count value stored by the network side entity to the communication terminal if the check result of the checking sub-module is not consistent.

In addition, the first obtaining module 502 may further include:

a third obtaining module, configure to obtain a Count value stored by the network side entity; and a third generating sub-module, configured to generate a new root key Kasme according to the RAND obtained by the second obtaining sub-module, the Count value stored by the network side entity which is obtained by the third obtaining module and the root key Kasme included in the information relevant to security context.

An embodiment of the present invention further provides a network side entity, which is configured to execute the steps of related methods of the network side entity in the above-mentioned embodiments of the method, including:

a storing module, configured to store information relevant to security context if a communication terminal which communicates with the network side entity has a characteristic of small data transmission;

a first obtaining module, configured to obtain current security context according to the information relevant to security context; and a security protecting module, configured to protect security of communication data by employing the current security context.

The storing module is specifically configured to store, if the communication terminal which communicates with the network side entity has the characteristic of small data transmission, the information relevant to security context when last communication is over. The first obtaining module is specifically configured to obtain the current security context according to the information relevant to security context at the beginning of the current communication.

The storing module may further include:

a query module, configured to query a HSS about an MTC characteristic information of the communication terminal; and a determining module, configured to determine that the communication terminal has the characteristic of small data transmission according to the MTC characteristic information queried by the query module.

The network side entity may further include:

a sending module, configured to send a detach request message or a detach accept message to the communication terminal, wherein the detach request message or the detach accept message includes a random number RAND and an authentication token AUTN in an authentication vector AV.

The first obtaining module may further include:

a fourth obtaining sub-module, configured to generate the security context according to an algorithm and a Kasme in an AV included in the information relevant to security context; or a first obtaining sub-module, configured to take security context included in the information relevant to security context as the current security context; or a second obtaining sub-module, configured to receive a random number generated by the communication terminal;

a third generating sub-module, configured to generate a new root key according to the random number generated by the communication terminal, a Count value stored by the network side entity and a root key Kasme included in the information relevant to security context; and a forth generating sub-module, configured to generate the current security context according to the new root key and an algorithm included in the information relevant to security context.

The network side entity may further include:

a second obtaining sub-module, configured to receive a Count value sent by the communication terminal, wherein the sent Count value is number of times the communication terminal and the network side entity perform fast authentication; and a sending sub-module, configured to send a Count value stored by the network side entity to the communication terminal if the received Count value is not consistent with the Count value stored by the network side entity.

The network side entity may further include:

a second obtaining sub-module, configured to receive a random number generated by the communication terminal, a Count value sent by the communication terminal and a message authentication code MAC value sent by the communication terminal;

a calculating sub-module, configured to calculate a message authentication code MAC value according to the random number generated by the communication terminal, the Count value sent by the communication terminal, and an algorithm and a root key Kasme included in the information relevant to security context; and an authenticating sub-module, configured to check whether the calculated MAC value is consistent with the MAC value sent by the communication terminal, and determine that an authentication of the communication terminal performed by the network side entity is successful if the calculated MAC value is consistent with the MAC value sent by the communication terminal.

The network side entity may further include:

a second obtaining sub-module, configured to receive a random number generated by the communication terminal;

a third generating sub-module, configured to generate a new root key according to the random number generated by the communication terminal, the Count value stored by the network side entity and the root key Kasme included in the information relevant to security context;

an RES generating module, configured to generate a response value RES according to the new root key and the random number generated by the communication terminal; and an RES sending module, configured to send the generated RES to the communication terminal.

An embodiment of the present invention provides a communication terminal, which is configured to execute the steps of related methods of the communication terminal in the above-mentioned embodiments of the method, including:

a storing module, configured to store information relevant to security context if the communication terminal has a characteristic of small data transmission;

a first obtaining module, configured to obtain current security context according to the information relevant to security context; and a security protecting module, configured to protect security of communication data by employing the current security context.

The storing module is specifically configured to store the information relevant to security context when last communication is over if the communication terminal which communicates with the network side entity has the characteristic of small data transmission. The first obtaining module is specifically configured to obtain the current security context according to the information relevant to security context at the beginning of the current communication.

The storing module may further include:

a determining module, configured to obtain its own MTC characteristic information according to configuration information, and determine whether the communication terminal has the characteristic of small data transmission.

The first obtaining module may further include:

a receiving sub-module, configured to receive a detach request message or a detach accept message sent by a network side entity;

a storing sub-module, configured to store an RAND and an AUTN in the detach request message or in the detach accept message;

a first generating sub-module, configured to authenticate the AUTN, and generate a Kasme according to the RAND and the AUTN; and a third generating sub-module, configured to generate the current security context according to the generated Kasme and an algorithm in the information relevant to security context; or a first obtaining sub-module, configured to take security context included in the information relevant to security context as the current security context; or a second obtaining sub-module, configured to obtain a Count value of the communication terminal and a random number generated by the communication terminal, wherein the Count value of the communication terminal is number of times the communication terminal and the network side entity perform fast authentication;

a third generating sub-module, configured to generate a new root key according to the random number and the Count value obtained by the second obtaining sub-module, and a root key Kasme included in the information relevant to security context; and a forth generating sub-module, configured to generate the current security context according to the new root key and an algorithm included in the information relevant to security context.

The communication terminal may further include:

a second obtaining sub-module, configured to obtain a Count value of the communication terminal and a random number generated by the communication terminal, wherein the sent Count value is number of times the communication terminal and the network side entity perform fast authentication;

a third generating sub-module, configured to generate a message authentication code MAC value according to the random number and the Count value obtained by the second obtaining sub-module, and a root key Kasme included in the information relevant to security context; and a sending sub-module, configured to send the generated MAC value to the network side entity.

In the communication terminal, the second obtaining sub-module may further configured to receive a Count value stored by the network side entity sent by a network side, and update the Count value of the communication terminal to the Count value stored by the network side entity if the Count value of the communication terminal is not consistent with the Count value stored by the network side entity.

The communication terminal may further include:

an RES receiving module, configured to receive an RES sent by the network side entity;

an RES generating module, configured to generate an RES according to the new root key generated by the third generating sub-module and the random number obtained by the second obtaining sub-module; and an RES authenticating module, configured to check whether the generated RES is consistent with the RES sent by the network side entity, and determine that an authentication of the network side entity performed by the MTC device is successful if the generated RES is consistent with the RES sent by the network side entity.

It should be noted that, in practical applications, the divided multiple modules of the apparatus for protecting security of data provided by the embodiment of the present invention of as shown in FIG. 5 to FIG. 9 may also be implemented by one module or functionality module with similar functionalities to that of the multiple modules, and will not be described redundantly herein.

A specific implementation method of the apparatus for protecting security of data provided by the embodiment of the present invention may be referred to the descriptions of the method for protecting security of data provided by the embodiment of the present invention, and will not be described redundantly herein.

In the apparatus for protecting security of data provided by the embodiment of the present invention, if the communication terminal has a characteristic of small data transmission, information relevant to security context is stored, security context is obtained according to the information relevant to security context, and security protection of communication data is performed by employing the security context, thereby solving the problem of the prior art in which a small data communication terminal delete security context when communication is over, causing that the communication data cannot be protected in next communication. The technical solutions provided by the embodiments of the present invention can ensure secure transmission of data and improve security of communication.

The steps of the method or the algorithm described by the embodiment which is disclosed in by the present context may be implemented directly by hardware, software module executed by a processor, or a combination of the two. The software module may be placed in a random access memory (RAM), a memory, a read-only memory (ROM), an electrically programmable ROM, an electrically erasable and programmable ROM, a register, a hard disk, a removable disk, a CD-ROM, or any other form of well known storage medium in the technical field.

The foregoing is merely some specific implementation of the present invention, which the protection scope of the present invention is not limited to. Changes or substitutions that can be readily thought by those skilled in the art within the technical scope disclosed by the present invention should fall in the protection scope of the present invention. Therefore, the protection scope of the present invention should be defined by that of the claims.

What is claimed is:

1. A method for protecting security of data, which is applied to a machine type communication, comprising:

querying, by a network side entity, a home subscribe server (HSS) whether there is machine type communication (MTC) characteristic information of a communication terminal;

determining, by the network side entity, whether communication between the communication terminal and the network side entity is a small data transmission according to the MTC characteristic information of the communication terminal;

storing, by the network side entity, information pertaining to security context if the communication terminal which communicates with the network side entity is a small data transmission, wherein the step of storing the information pertaining to the security context is performed subsequent to the step of querying the HSS;

obtaining, by the network side entity, a current security context according to the information pertaining to security context; and protecting, by the network side entity, security of communication data by employing the current security context, wherein the information pertaining to the security context comprises:

an algorithm and an authentication vector (AV) comprising a random number (RAND) and an authentication token (AUTN), or an algorithm and a root key (Kasme).

2. The method of claim 1, further comprising:

sending, by the network side entity, a detach request message or a detach accept message to the communication terminal, wherein the detach request message comprises the authentication vector (AV).

3. The method of claim 1, wherein when the information pertaining to the security context comprises the algorithm and the authentication vector (AV), the obtaining, by the network side entity, the current security context according to the information pertaining to the security context, comprises:

generating, by the network side entity, the security context according to the algorithm and a root key (Kasme) in the authentication vector (AV) comprised in the information pertaining to the security context.

4. The method of claim 1, wherein the obtaining, by the network side entity, the current security context according to the information pertaining to the security context, comprises:

receiving, by the network side entity, a random number (RAND) generated by the communication terminal;

(Kasme) according to the random number (RAND) generated by the communication terminal, a Count value stored by the network side entity and the root key (Kasme) comprised in the information pertaining to the security context; and generating, by the network side entity, the current security context according to the new root key (Kasme) and the algorithm comprised in the information pertaining to security context.

5. A method for protecting security of data, which is applied to a machine type communication (MTC), comprising:

obtaining, by a communication terminal, MTC characteristic information of the communication terminal according to configuration information;

determining, by the communication terminal, whether communication with the communication terminal is a small data transmission according to the MTC characteristic information of the communication terminal;

storing, by the communication terminal, information pertaining to a security context if the communication with the communication terminal is a small data transmission, wherein the step of storing the information pertaining to the security context is performed subsequent to the step of obtaining the MTC characteristic information;

obtaining, by the communication terminal, a current security context according to the information pertaining to the security context; and protecting, by the communication terminal, security of communication data by employing the current security context, wherein the information pertaining to the security context comprises:
    an algorithm and an authentication vector (AV) comprising a random number (RAND) and an authentication token (AUTN), or
    an algorithm and a root key (Kasme).

6. The method of claim 5, wherein the storing, by a communication terminal, information pertaining to the security context, comprises:

receiving, by the communication terminal, a detach request message or a detach accept message sent by a network side entity; and storing, by the communication terminal, the random number (RAND) and the authentication token (AUTN) in the detach request message or the detach accept message.

7. The method of claim 6, wherein the obtaining, by the communication terminal, the current security context according to the information pertaining to the security context, comprises:

validating, by the communication terminal, the authentication token (AUTN);

generating, by the communication terminal, a root key (Kasme) according to the random number (RAND) and the authentication toke (AUTN); and generating, by the communication terminal, the current security context according to the generated root key (Kasme) and the algorithm in the information pertaining to the security context.

8. The method of claim 5, wherein the obtaining, by the communication terminal, the current security context according to the information pertaining to the security context, comprises:

taking, by the communication terminal, the security context comprised in the information pertaining to the security context as the current security context.

9. The method of claim 5, wherein the obtaining, by the communication terminal, the current security context according to the information pertaining to the security context, comprises:

obtaining, by the communication terminal, a Count value of the communication terminal and a random number (RAND) generated by the communication terminal, wherein the Count value of the communication terminal is number of times the communication terminal and the network side entity perform authentication;

generating a new root key according to the random number (RAND) generated by the communication terminal, the Count value of the communication terminal and the root key (Kasme) comprised in the information pertaining to the security context; and generating the current security context according to the new root key and the algorithm comprised in the information pertaining to security context.

10. A communication terminal, which is applied to a machine type communication (MTC), comprising:

a storing module, configured to store information pertaining to a security context if communication with the communication terminal is a small data transmission;

a first obtaining module, configured to obtain a current security context according to the information pertaining to the security context; and a security protecting module, configured to protect security of communication data by employing the current security context, wherein the storing module further comprises:

a determining module, configured to determine whether communication with the communication terminal is a small data transmission according to machine type communication (MTC) characteristic information, wherein the determining module is further configured to obtain its own MTC characteristic information according to configuration information, and wherein the first obtaining module further comprises:

a receiving sub-module, configured to receive a detach request message or a detach accept message sent by a network side entity;

a storing sub-module, configured to store a random number (RAND) and an authentication token (AUTN) in the detach request message or the detach accept message;

a first generating sub-module, configured to validate the AUTN, and generate a root key (Kasme) according to the random number (RAND) and the authentication token (AUTN); and a third generating sub-module, configured to generate the current security context according to the generated root key (Kasme) and an algorithm in the information pertaining to the security context.

11. The communication terminal of claim 10, further comprising:

a second obtaining sub-module, configured to obtain a Count value of the communication terminal and a random number generated by the communication terminal, wherein the Count value of the communication terminal is the number of times the communication terminal and a network side entity perform authentication;

(Kasme) comprised in the information pertaining to the security context; and a sending sub-module, configured to send the generated message authentication code (MAC) value to the network side entity.

12. The communication terminal of claim 11, wherein the second obtaining sub-module is further configured to receive a Count value stored by the network side entity sent by a network side, and update the Count value of the communication terminal to the Count value stored by the network side entity if the Count value of the communication terminal is does not match the Count value stored by the network side entity.

13. The communication terminal of claim 10, further comprising:

an a response value (RES) receiving module, configured to receive a response value (RES) sent by a network side entity;

a response value (RES) generating module, configured to generate a response value (RES) according to a new root key generated by the third generating sub-module and the random number obtained by the second obtaining sub-module; and an a response value (RES) authenticating module, configured to check whether the generated response value (RES) matches the response value (RES) sent by the network side entity, and determine, if the generated RES matches the (RES) sent by the network side entity, then the communication terminal authenticates the network side entity successfully.

* * * * *

UNITED STATES PATENT AND TRADEMARK OFFICE
CERTIFICATE OF CORRECTION

PATENT NO. : 9,189,632 B2  
APPLICATION NO. : 13/943469  
DATED : November 17, 2015  
INVENTOR(S) : Zhang et al.

Page 1 of 1

It is certified that error appears in the above-identified patent and that said Letters Patent is hereby corrected as shown below:

Title page, item (63) Related U.S. Application Data, "PCT/CN2010/070475" should read -- PCT/CN2012/070475 --.

Signed and Sealed this
Fifth Day of July, 2016

Michelle K. Lee
*Director of the United States Patent and Trademark Office*